United States Patent
Kwak et al.

(10) Patent No.: US 7,606,200 B2
(45) Date of Patent: Oct. 20, 2009

(54) SUPPORTING HANDOVER OF MULTI-MODE MOBILE TERMINAL BETWEEN HETEROGENEOUS NETWORKS

(75) Inventors: Yong Won Kwak, Anyang-si (KR); Yong Ho Kim, Bucheon-si (KR); Jin Lee, Seoul (KR)

(73) Assignee: LG Electronics, Inc., Seoul (KR)

( * ) Notice: Subject to any disclaimer, the term of this patent is extended or adjusted under 35 U.S.C. 154(b) by 461 days.

(21) Appl. No.: 11/357,888

(22) Filed: Feb. 16, 2006

(65) Prior Publication Data

US 2006/0187882 A1 Aug. 24, 2006

(30) Foreign Application Priority Data

Feb. 18, 2005 (KR) .................. 10-2005-0013491
Apr. 13, 2005 (KR) .................. 10-2005-0030725

(51) Int. Cl. *H04W 4/00* (2009.01)
(52) U.S. Cl. ............... 370/331; 370/332; 370/333; 370/334; 455/436; 455/437; 455/438; 455/439; 455/440; 455/441; 455/442
(58) Field of Classification Search .............. 370/254
See application file for complete search history.

(56) References Cited

U.S. PATENT DOCUMENTS

| | | |
|---|---|---|
| 2004/0067754 A1 | 4/2004 | Gao et al. |
| 2004/0137903 A1 | 7/2004 | Park |
| 2004/0202128 A1 | 10/2004 | Hovmark et al. |
| 2005/0037757 A1 | 2/2005 | Moon et al. |
| 2006/0140150 A1 * | 6/2006 | Olvera-Hernandez et al. .................. 370/331 |
| 2006/0187858 A1 * | 8/2006 | Kenichi et al. .............. 370/254 |
| 2006/0217147 A1 * | 9/2006 | Olvera-Hernandez et al. .... 455/552.1 |

* cited by examiner

*Primary Examiner*—Dwayne Bost
*Assistant Examiner*—Pierre-Louis Desir
(74) *Attorney, Agent, or Firm*—Lee, Hong, Degerman, Kang & Waimey

(57) ABSTRACT

The present invention relates to supporting media independent handover of a mobile terminal to a heterogeneous network. Preferably, the present invention establishes a unified interface to an upper layer of the mobile terminal for managing messages to and from at least one of a homogeneous network and a heterogeneous network. Furthermore, the present invention requests a scan of a heterogeneous network different from a current network of the mobile terminal via the unified interface to determine the presence of an accessible link of the heterogeneous network for performing the handover.

8 Claims, 14 Drawing Sheets

Local Stack

Remote Stack

SUPPORTING HANDOVER OF MULTI-MODE MOBILE TERMINAL BETWEEN HETEROGENEOUS NETWORKS

CROSS-REFERENCE TO RELATED APPLICATIONS

Pursuant to 35 U.S.C. § 119(a), this application claims the benefit of earlier filing date and right of priority to Korean Application No. P05-013491, filed on Feb. 18, 2005 and Korean Application No. P05-030725, filed on Apr. 13, 2005, the contents of which are hereby incorporated by reference herein in their entirety.

FIELD OF THE INVENTION

The present invention relates to a multi-mode mobile terminal, and more particularly, to allowing a multi-mode mobile terminal, such as a mobile terminal for use in a broadband wireless access network system, a wireless local access network (LAN), a wired LAN, and a cellular system interface to effectively perform a handover function between heterogeneous networks.

BACKGROUND OF THE INVENTION

Currently, standards committee IEEE 802.21 conducts intensive research into the international standards associated with media independent handover (MIH) between heterogeneous networks. MIH provides not only a seamless handover but also a service continuity between the heterogeneous networks, resulting in greater convenience for a user carrying a mobile terminal. IEEE 802.21 defines a variety of functions (e.g., an MIH function, an event trigger function, and an information service (IS) function) as basic requirements.

A mobile subscriber station (MSS) is indicative of a multi-mode node for supporting at least two interface types. The above-mentioned interface type may be determined to be one of a wired interface type (also called a wire-line interface type) such as the Ethernet based on an IEEE 802.3 standard specification, a wireless interface type based on IEEE 802.XX standard specifications (e.g., IEEE 802.11, IEEE 802.15, and IEEE 802.16), and other interface types defined by a cellular standardization organization (e.g., 3GPP or 3GPP2). However, it should be noted that the aforementioned interface types are not limited to the aforementioned wired interface type, wireless interface types, and other interface types, and are applicable to other examples as necessary.

A general Media Independent Handover Function (MIHF) reference model is depicted in FIG. 1. In the figure, MIHF architecture for interaction with other layers and with the remote MIHG is illustrated. In order for the MIHF to provide asynchronous and synchronous services to lower layers and higher layers, Service Access Points (SAPs) such as MIH_MGMT_SAP, MIH_SME_SAP and MIH_SAP along with primitives are defined. MIH_MGMT_SAP defines the interface between the MIHF and the management plane (Management Entity) of different network interfaces and is used for transporting MIH protocol messages between the MIHF and local link layer entities as well as peer MIHF entities. MIH_SAP defines the interface between the MIHF and higher layer entities such as device manager, handover policy control function, transport, layer 3 (L3) mobility management protocol, etc., and is used for MIH configuration and operation. MIH_SME_SAP defines the interface between the MIHF and the Station Management Entity or the Network Management System, and is used for MIG configuration and operation.

FIG. 2 is a structural diagram illustrating a protocol layer of a multi-mode mobile terminal (also called a multi-mode MSS). Referring to FIG. 2, the multi-mode mobile terminal includes a physical (PHY) layer and a Medium Access Control (MAC) layer for individual modes, and locates a Media Independent Handover (MIH) layer under an Internet Protocol (IP) layer.

Media Independent Handover (MIH) must be defined between IEEE 802-series interfaces or between an IEEE 802-series interface and a non-IEEE 802-series interface, such as the aforementioned interface type defined by a cellular standardization organization (e.g., 3GPP and 3GPP2). Also, a protocol for supporting mobility of upper layers such as a mobile IP and a Session Initiation Protocol (SIP) must be supported for a handover function and continuity of services.

The MIH function is located under the IP layer, and facilitates a handover process using input values (e.g., a trigger event and information associated with other networks) received from a second layer (Layer 2). The MIH function may include a plurality of input values based on both user policy and configuration which may affect the handover process. General interfaces among the mobile IP, a third layer (Layer 3) entity such as an SIP (Session Initiation Protocol), and the MIH layer are defined. In this case, the aforementioned interfaces provide the first layer (i.e., the physical layer), the second layer (i.e., the MAC layer), and mobility management information. The MIH function acquires information associated with a lower layer and a network using event and information service (IS) functions.

An upper layer includes an upper management entity for monitoring states and operations of various links contained in a mobile terminal, such that it performs a handover control function and a device manager function. In this case, the handover control function and the device manager may be located at different locations independent of each other, or the handover control function and the device manager may be included as the upper management entities in the upper layer.

FIG. 3 shows a mobile terminal function entity including the MIH function, a network function entity, and a transmission protocol. Dotted lines of FIG. 3 are indicative of primitive information and an event trigger, for example.

In order to quickly perform a handover function, a network layer must use information generated from a link layer, such that the network layer can quickly re-establish a connection state. The link layer event is adapted to predict the movement of a user, and helps a mobile terminal and a network prepare the handover function.

A trigger for the handover may be initiated from the physical (PHY) layer and the MAC layer. A source of the trigger may be a local stack or a remote stack. FIG. 4 is a block diagram illustrating a trigger model.

An event trigger provides state information of a current signal, state change information of another network, and future predicted change information. The event trigger also includes change information of the physical and MAC layers or attribute change information of a specific network.

The event types can be classified into a physical (PHY) layer event, a MAC layer event, a management event, a third layer (L3) event, and an application event, for example. The basic trigger events will hereinafter be described.

A "Link_Up" event occurs when a second layer (L2) connection is established on a specific link interface and an upper layer is able to transmit third layer (L3) packets. In this case, it is determined that all L2 layers contained in a link have been completely configured. A source of the "Link_Up" event corresponds to a "Local MAC" and a "Remote MAC". The following Table 1 shows parameters of the "Link_Up" event.

TABLE 1

| Name | Type | Description |
| --- | --- | --- |
| EventSource | EVENT_LAYER_TYPE | Source at which event occurs |
| EventDestination | EVENT_LAYER_TYPE | Destination to which event is to be transmitted |
| MacMobileTerminal | MAC Address | MAC address of Mobile Terminal |
| MacOldAccessRouter | MAC Address | MAC address of old access router |
| MacNewAccessRouter | MAC Address | MAC address of new access router |
| NetworkIdentifier | Media Specific | Network ID used for detecting subnet change |

A "Link_Down" event occurs when the L2 connection is released on a specific interface and L3 packets cannot be transmitted to a destination. A source of the "Link_Down" event is indicative of a local MAC. The following Table 2 shows parameters of the "Link_Down" event.

TABLE 2

| Name | Type | Description |
| --- | --- | --- |
| EventSource | EVENT_LAYER_TYPE | Source at which event occurs |
| EventDestination | EVENT_LAYER_TYPE | Destination to which event is to be transmitted |
| MacMobileTerminal | MAC Address | MAC address of Mobile Terminal |
| MacOldAccessRouter | MAC Address | MAC address of old access router |
| ReasonCode | | Reason for released link |

A "Link_Going_Down" event occurs when it is expected that the L2 connection will enter a "Link_Down" state within a predetermined time, and may serve as a signal for initializing a handover procedure. A source of the "Link_Going_Down" corresponds to a "Local MAC" and a "Remote MAC". The following Table 3 shows parameters of the "Link_Going_Down" event.

TABLE 3

| Name | Type | Description |
| --- | --- | --- |
| EventSource | EVENT_LAYER_TYPE | Source at which event occurs |
| EventDestination | EVENT_LAYER_TYPE | Destination to which event is to be transmitted |
| MacMobileTerminal | MAC Address | MAC address of Mobile Terminal |
| MacOldAccessRouter | MAC Address | MAC address of old access router |
| MacNewAccessRouter | MAC Address | MAC address of new access router |
| TimeInterval | Time in msecs | Predicted Link_Down time of link |
| ConfidenceLevel | % | Link_Down level predicted at specific time |
| UniqueEventIdentifier | | Use in event rollback occurrence |

A "Link_Going_Up" event occurs when it is expected that the L2 connection will enter a "Link_Up" state within a predetermined time, and is used when a long period of time is consumed to initialize a network. A source of the "Link_Going_Up" event corresponds to a "Local MAC" and a "Remote MAC". The following Table 4 shows parameters of the "Link_Going_Up" event.

TABLE 4

| Name | Type | Description |
| --- | --- | --- |
| EventSource | EVENT_LAYER_TYPE | Source at which event occurs |
| EventDestination | EVENT_LAYER_TYPE | Destination to which event is to be transmitted |
| MacMobileTerminal | MAC Address | MAC address of Mobile Terminal |
| MacNewAccessRouter | MAC Address | MAC address of new access router |
| TimeInterval | Time in msecs | Predicted Link_UP time of link |
| ConfidenceLevel | % | Link_UP level predicted at specific time |
| UniqueEventIdentifier | | Use in event rollback occurrence |

A "Link_Event_Rollback" event is formed by combining the "Link_Going_Down" event with the "Link_Going_Up" event. The "Link_Event_Rollback" event is indicative of a trigger generated when it is expected that the "Link_UP" event or "Link_Down" event will not be generated any more within a specific time on the condition that the "Link_Going_Up" event or "Link_Going_Down" event are transmitted to a destination. A source of the "Link_Event_Rollback" event corresponds to a "Local MAC" and a "Remote MAC". The following Table 5 shows parameters of the "Link_Event_Rollback" event.

TABLE 5

| Name | Type | Description |
| --- | --- | --- |
| EventSource | EVENT_LAYER_TYPE | Source at which event occurs |
| EventDestination | EVENT_LAYER_TYPE | Destination to which event is to be transmitted |
| MacMobileTerminal | MAC Address | MAC address of Mobile Terminal |
| MacNewAccessRouter | MAC Address | MAC address of new access router |
| UniqueEventIdentifier | | Use in event rollback occurrence |

A "Link_Available" event is indicative of an available state of a new specific link, and indicates the possibility of allowing a new base station (BS) or a new Point of Attachment (POA) to provide a link superior in quality as compared to a current BS or a current POA to which a current mobile terminal is connected. A source of the "Link_Available" event corresponds to a "Local MAC" and a "Remote MAC". The following Table 6 shows parameters of the "Link_Available" event.

TABLE 6

| Name | Type | Description |
| --- | --- | --- |
| EventSource | EVENT_LAYER_TYPE | Source at which event occurs |
| EventDestination | EVENT_LAYER_TYPE | Destination to which event is to be transmitted |
| MacMobileTerminal | MAC Address | MAC address of Mobile Terminal |
| MacNewAccessRouter | MAC Address | MAC address of new access router |
| MacOldAccessRouter | MAC Address | MAC address of old access router |

A "Link_Parameter_Change" event is indicative of an event generated when a change of a link parameter value is higher than a specific threshold level. The "Link_Parameter_Change" event includes link layer parameters, for example, a link speed (i.e., a link rate), a QoS (Quality of Service), and an encrypted value, etc. A source of the "Link_Parameter_Change" event corresponds to a "Local MAC" and a "Remote MAC". The following Table 7 shows parameters of the "Link_Parameter_Change" event.

TABLE 7

| Name | Type | Description |
| --- | --- | --- |
| EventSource | EVENT_LAYER_TYPE | Source at which event occurs |
| EventDestination | EVENT_LAYER_TYPE | Destination to which event is to be transmitted |
| MacMobileTerminal | MAC Address | MAC address of Mobile Terminal |
| MacAccessRouter | MAC Address | MAC address of new access router |
| oldValueOfLinkParameter | | Old value of link parameters |
| newValueOfLinkParameter | | New value of link parameters |

FIG. 5 exemplarily shows triggers generated until a new link is established when a quality of a current access link is deteriorated.

An information service provides detailed information associated with a network required for both network discovery and network selection, and must be designed to be freely accessed by a user over any network. The information service must include a variety of information components, for example, a link access parameter, a security mechanism, a neighborhood map, a location, information indicative of a service provider and other access information, and a link cost (i.e., cost of link).

The MAC layer of a link interface to which the multi-mode mobile terminal is connected transmits the "Link_Going_Down" trigger to the MIH when a signal quality of the currently connected link is deteriorated, and then performs a scanning process to determine the presence or absence of an accessible link in a homogeneous network. If the accessible link is not detected from the homogeneous network, the mobile terminal must perform the scanning process to determine the presence or absence of the accessible link in a heterogeneous network, but associated prior arts for the aforementioned scanning process have not yet been developed, such that a handover function between heterogeneous networks for the multi-mode mobile terminal cannot be effectively supported.

SUMMARY OF THE INVENTION

The present invention is directed to supporting media independent handover of a mobile terminal to a heterogeneous network.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method for supporting media independent handover of a mobile terminal to a heterogeneous network, the method comprising establishing a unified interface to an upper layer of the mobile terminal for managing messages to and from at least one of a homogeneous network and a heterogeneous network and requesting a scan of a heterogeneous network different from a current network of the mobile terminal via the unified interface to determine the presence of an accessible link of the heterogeneous network for performing the handover.

Preferably, the step of requesting the scan is performed in the upper layer. Preferably, the heterogeneous network is periodically scanned. Preferably, the unified interface is a media independent handover function (MIHF) entity. Preferably, the upper layer comprises an upper management entity for managing homogeneous and heterogeneous network links associated with the mobile terminal.

In one aspect of the present invention, the method further comprises discovering the accessible link of the heterogeneous network, informing the upper layer of the accessible link via the unified interface, and establishing a connection with the accessible link. Preferably, the step of informing the upper layer of the accessible link via the unified interface comprises informing the upper layer of a signal quality of the accessible link of the heterogeneous network. Preferably, the signal quality comprises at least one of a signal to interference plus noise ratio (SINR) and a received signal strength indication (RSSI).

In another aspect of the present invention, the step of requesting a scan comprises at least one of identifying a source for where the request is generated, identifying a destination for where the request is to be transmitted, and providing an identification of the mobile terminal.

In accordance with another embodiment of the present invention, a method for supporting media independent handover of a mobile terminal to a heterogeneous network comprises establishing a unified interface to an upper layer of the mobile terminal for managing messages to and from at least one of a homogeneous network and a heterogeneous network, scanning a current network for a link different from a current link of the mobile terminal for performing the handover, reporting availability status of the link different from the current link of the current network, receiving the report in an upper layer of the mobile terminal via the unified interface, and requesting a scan of a heterogeneous network different from the current network via the unified interface to determine the presence of an accessible link of the heterogeneous network for performing the handover when the link of the current network different from the current link is not available.

Preferably, the step of requesting the scan is performed in the upper layer. Preferably, the heterogeneous network is periodically scanned. Preferably, the unified interface is a media independent handover function (MIHF) entity. Preferably, the upper layer comprises an upper management entity for managing homogeneous and heterogeneous network links associated with the mobile terminal.

In one aspect of the present invention, the method further comprises discovering the accessible link of the heterogeneous network, informing the upper layer of the accessible link via the unified interface, and establishing a connection with the accessible link. Preferably, the step of informing the upper layer of the accessible link via the unified interface comprises informing the upper layer of a signal quality of the accessible link of the heterogeneous network. Preferably, the signal quality comprises at least one of a signal to interference plus noise ratio (SINR) and a received signal strength indication (RSSI).

In another aspect of the present invention, the step of requesting a scan comprises at least one of identifying a source for where the request is generated, identifying a destination for where the request is to be transmitted, and providing an identification of the mobile terminal.

In accordance with another embodiment of the present invention, a method for supporting media independent handover of a mobile terminal to a heterogeneous network comprises establishing a unified interface to an upper layer of the mobile terminal for managing messages to and from at least one of a homogeneous network and a heterogeneous network, requesting a search for an accessible link of a heterogeneous network different from a current network of the mobile terminal for performing the handover, receiving the request in the upper layer of the mobile terminal via the unified interface, and requesting a scan of the heterogeneous network via the unified interface to determine the presence of the accessible link for performing the handover.

Preferably, the step of requesting the scan is performed in the upper layer. Preferably, the heterogeneous network is periodically scanned. Preferably, the unified interface is a media independent handover function (MIHF) entity. Preferably, the upper layer comprises an upper management entity for managing homogeneous and heterogeneous network links associated with the mobile terminal.

In one aspect of the present invention, the method further comprises discovering the accessible link of the heterogeneous network, informing the upper layer of the accessible link via the unified interface, and establishing a connection with the accessible link. Preferably, the step of informing the upper layer of the accessible link via the unified interface comprises informing the upper layer of a signal quality of the accessible link of the heterogeneous network. Preferably, the signal quality comprises at least one of a signal to interference plus noise ratio (SINR) and a received signal strength indication (RSSI).

In another aspect of the present invention, the method further comprises scanning the current network for an accessible link prior to requesting the search for the accessible link of the heterogeneous network different from the current network. Preferably, the step of requesting the search for the accessible link of the heterogeneous network different from the current network occurs when the presence of an accessible link in the homogeneous network is not detected.

In a further aspect of the present invention, the step of requesting a search comprises at least one of identifying a source for where the request is generated, identifying a destination for where the request is to be transmitted, and providing an identification of the mobile terminal.

In yet another aspect of the present invention, the step of requesting a scan comprises at least one of identifying a source for where the request is generated, identifying a destination for where the request is to be transmitted, and providing an identification of the mobile terminal.

In accordance with another embodiment of the present invention, a mobile terminal for supporting media independent handover to a heterogeneous network terminal comprises a unified interface to an upper layer of the mobile terminal for managing messages to and from at least one of a homogeneous network and a heterogeneous network and means for requesting a scan of a heterogeneous network different from a current network of the mobile terminal via the unified interface to determine the presence of an accessible link of the heterogeneous network for performing the handover.

In accordance with another embodiment of the present invention, a mobile terminal for supporting media independent handover to a heterogeneous network comprises a unified interface to an upper layer of the mobile terminal for managing messages to and from at least one of a homogeneous network and a heterogeneous network, means for scanning a current network for a link different from a current link of the mobile terminal for performing the handover, means for reporting availability status of the link different from the current link of the current network, means for receiving the report in an upper layer of the mobile terminal via the unified interface, and means for requesting a scan of a heterogeneous network different from the current network via the unified interface to determine the presence of an accessible link of the heterogeneous network for performing the handover when the link of the current network different from the current link is not available.

In accordance with another embodiment of the present invention, a mobile terminal for supporting media independent handover to a heterogeneous network comprises a unified interface to an upper layer of the mobile terminal for managing messages to and from at least one of a homogeneous network and a heterogeneous network, means for requesting a search for an accessible link of a heterogeneous network different from a current network of the mobile terminal for performing the handover, means for receiving the request in the upper layer of the mobile terminal via the unified interface, and means for requesting a scan of the heterogeneous network via the unified interface to determine the presence of the accessible link for performing the handover.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention relates to allowing a multi-mode mobile terminal to effectively perform a handover function between heterogeneous networks.

Reference will now be made in detail to the preferred embodiments of the present invention, examples of which are illustrated in the accompanying drawings. Wherever possible, the same reference numbers will be used throughout the drawings to refer to the same or like parts.

Preferably, a conventional event trigger model is extended to an event service and a command service. The event service is classified into an MIH event and a link event. The command service is classified into an MIH command and a link command.

Figure 1:
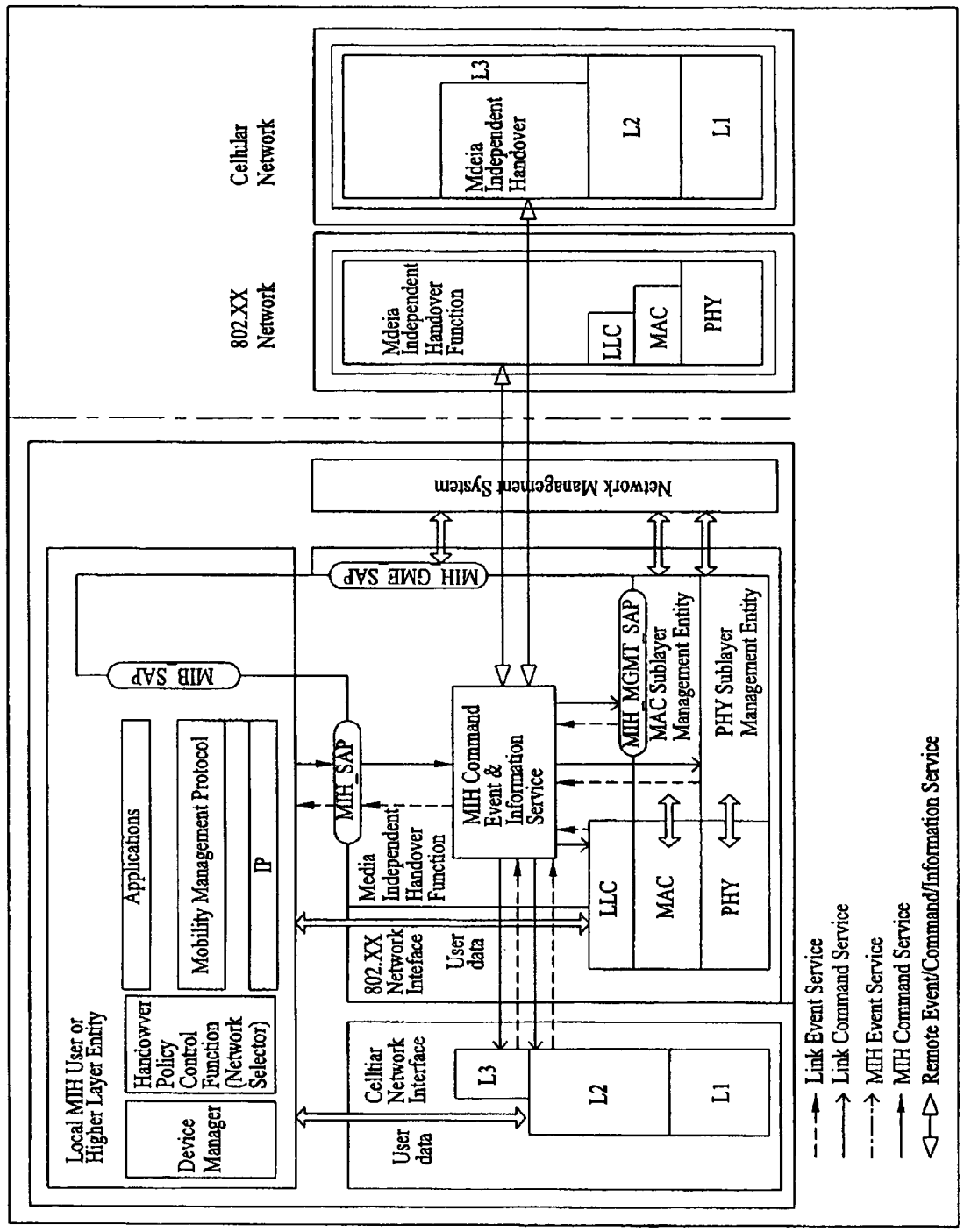
FIG. 1 illustrates a general media independent handover function (MIHF) reference model.
Figure 2:
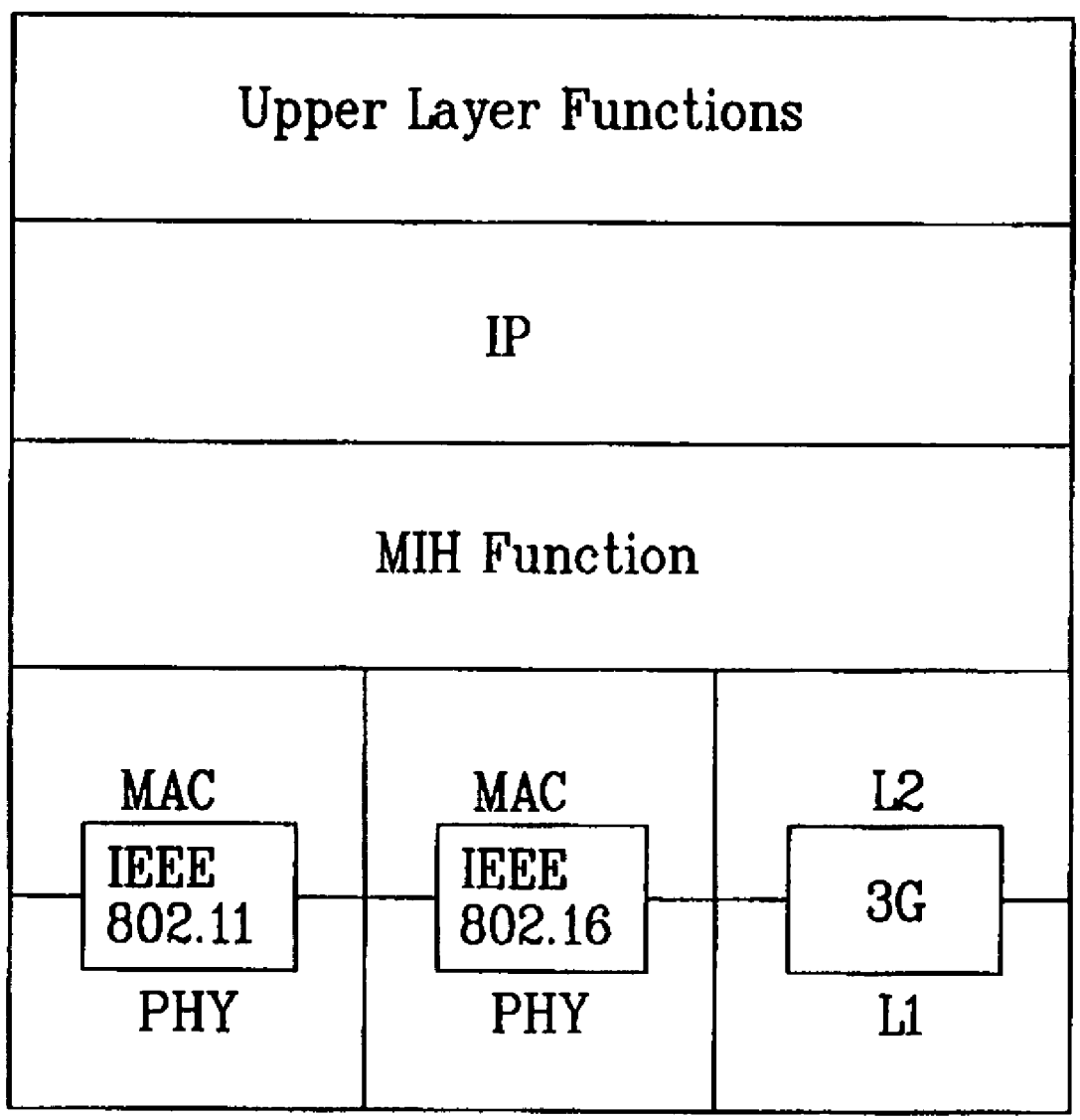
FIG. 2 is a structural diagram illustrating a conventional protocol layer of a multi-mode mobile terminal.
Figure 3:
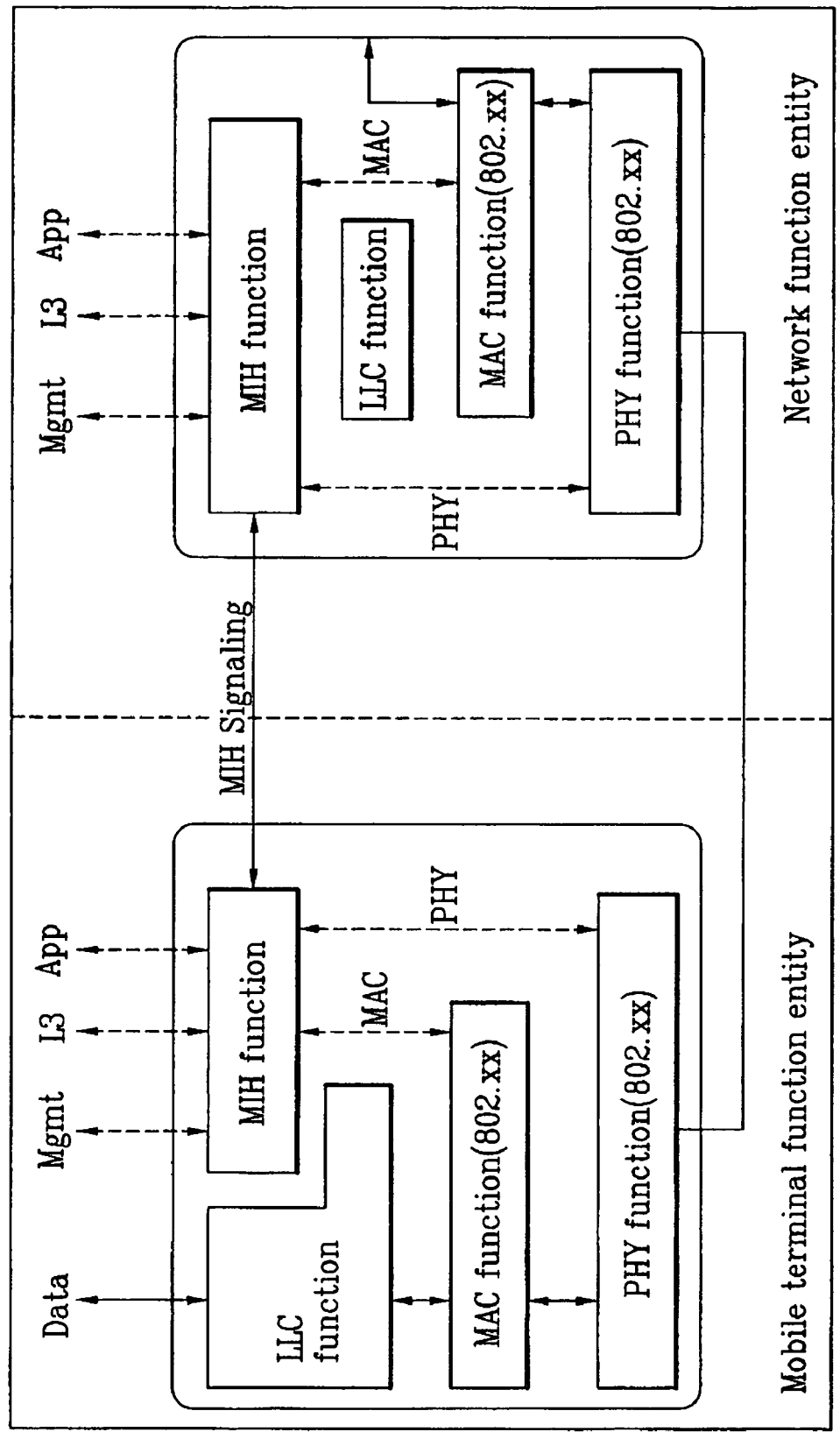
FIG. 3 is a block diagram illustrating a conventional mobile-terminal function entity and a conventional network function entity, each of which includes an MIH function.
Figure 4:
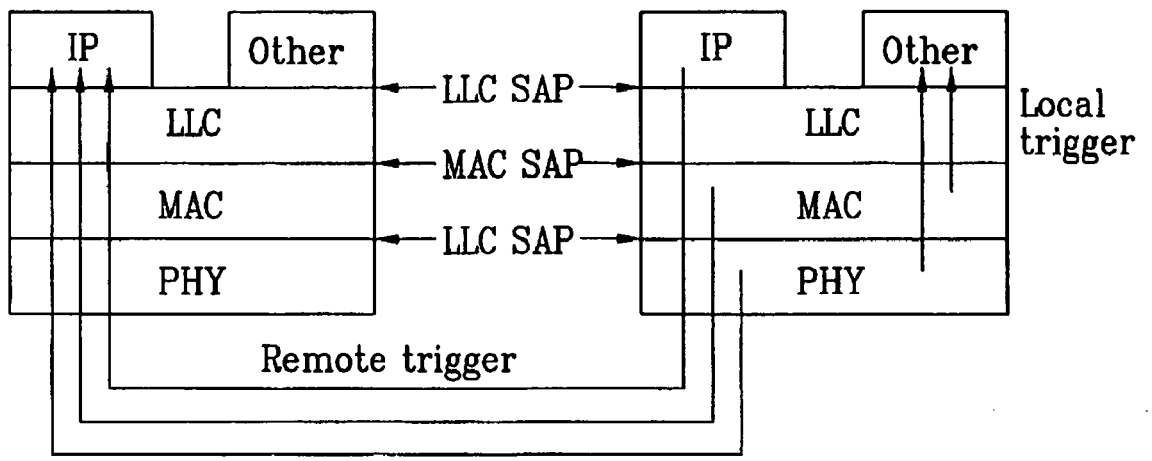
FIG. 4 is a structural diagram illustrating a conventional trigger model.
Figure 5:
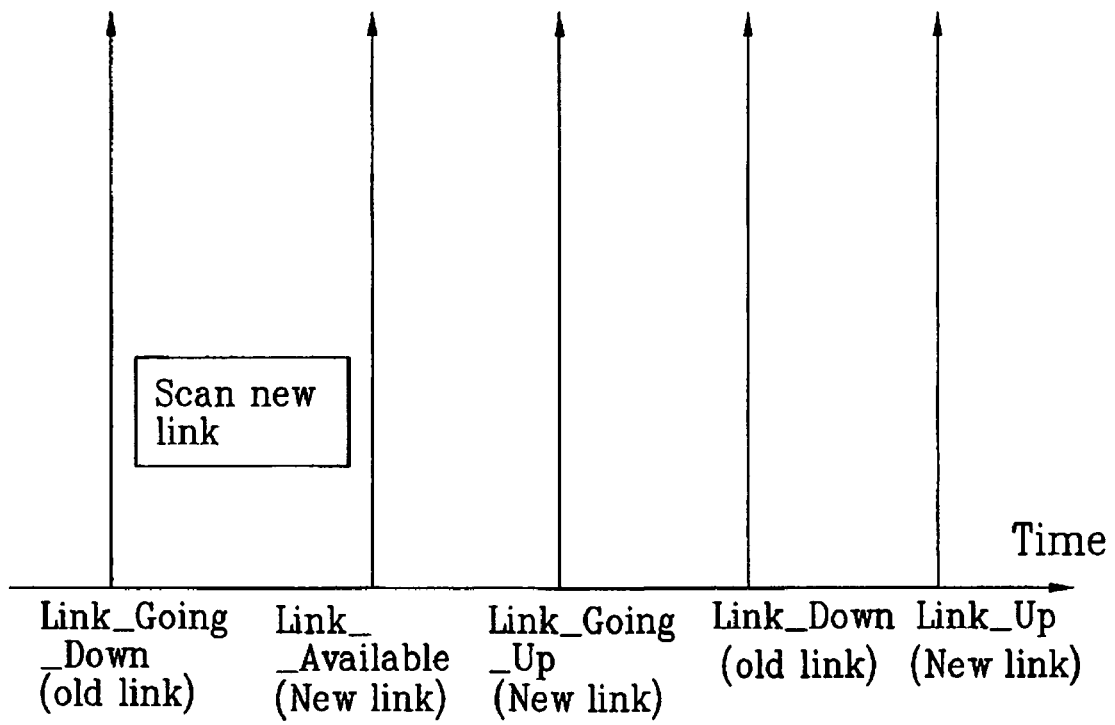
FIG. 5 shows conventional triggers generated until a new link is established when a quality of a link to which a mobile terminal is connected is deteriorated.
Figure 6:
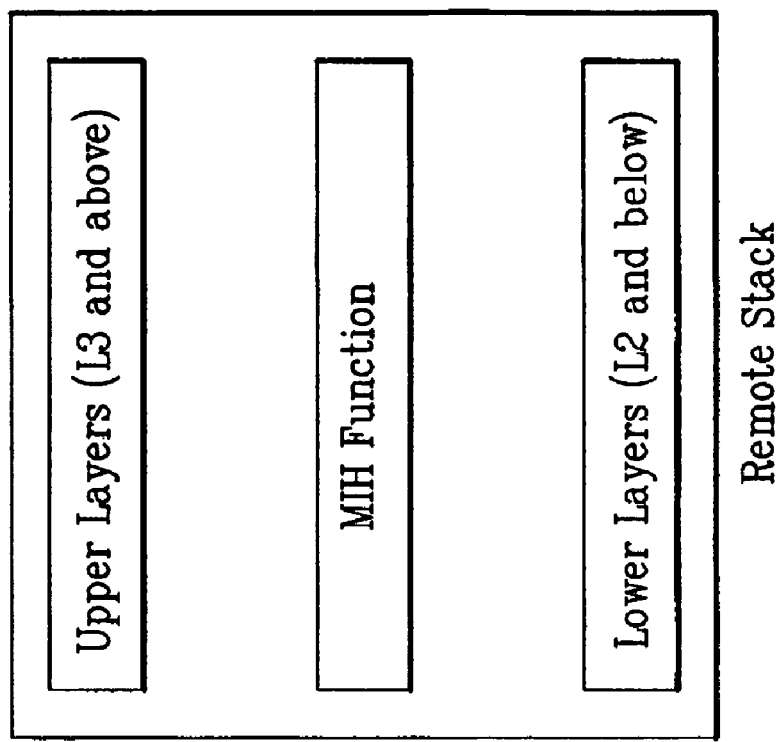
FIG. 6 is a structural diagram illustrating a "Link Event" model and an "MIH Event" model in accordance with one embodiment of the present invention.
Figure 6:
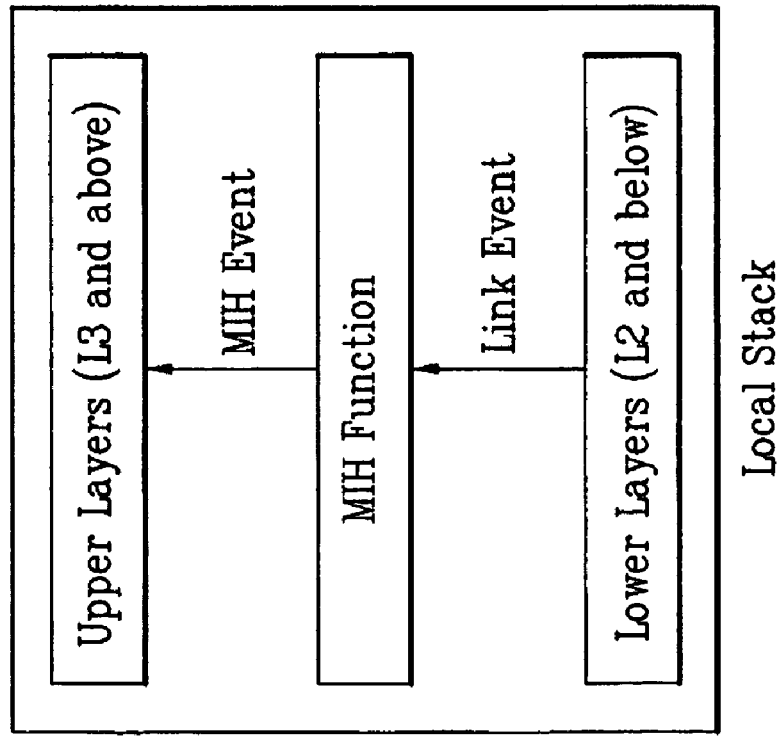

FIG. 6 is a structural diagram illustrating a "Link Event" model and an "MIH Event" model in accordance with one embodiment of the present invention. Referring to FIG. 6, the MIH event is indicative of an event transmitted from the MIH to either the upper management entity or the upper layer, and corresponds to conventional event triggers. The link event is indicative of an event transmitted from a lower layer (i.e., a MAC layer or a physical (PHY) layer) to the MIH, and uses primitives for use in individual interface MAC- or physical-layers.

Figure 7:
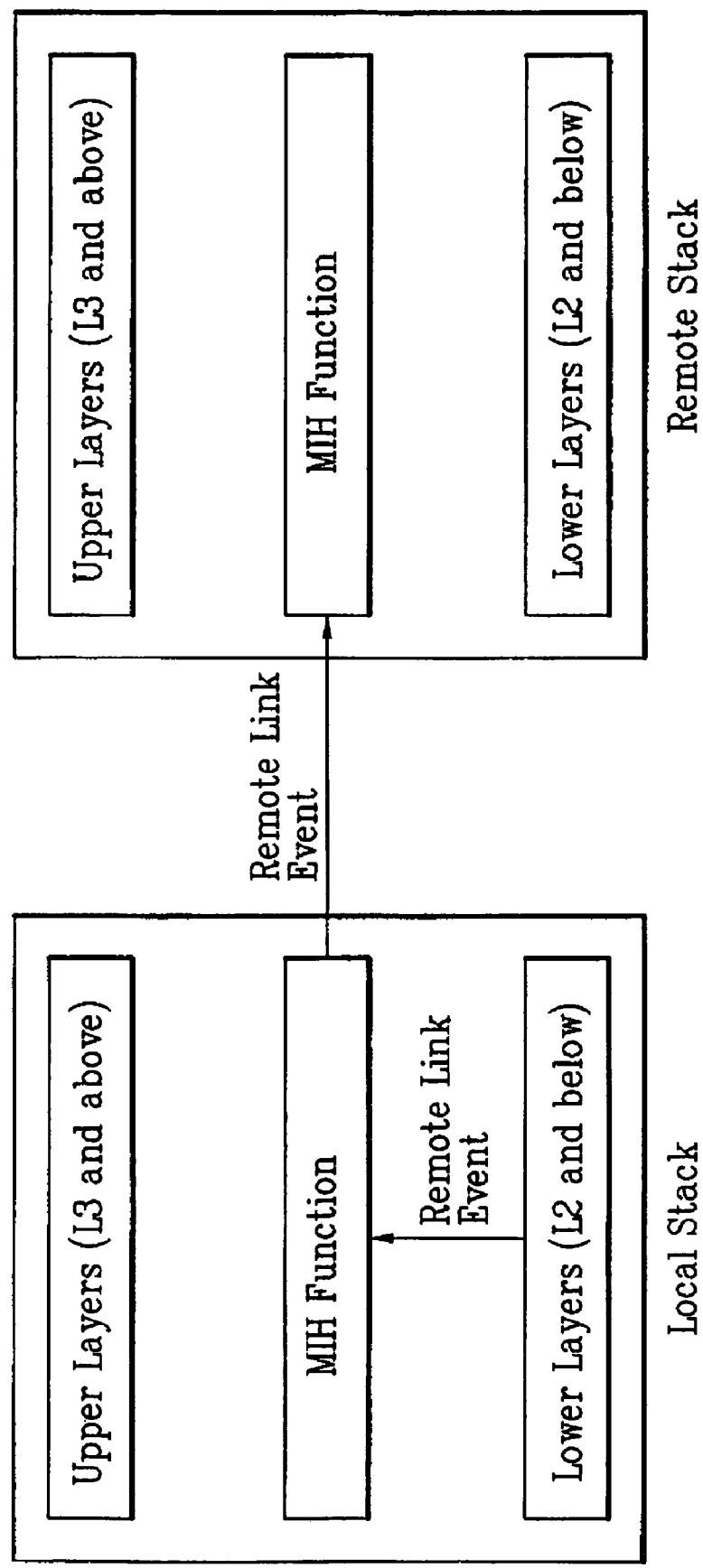
FIG. 7 is a structural diagram illustrating a "Remote Link Event" model in accordance with one embodiment of the present invention.

FIG. 7 is a structural diagram illustrating a "Remote Link Event" model in accordance with one embodiment of the present invention. Referring to FIG. 7, if a lower layer contained in a local stack generates an event and transmits the event to the MIH contained in a local stack, the MIH of the local stack transmits the aforementioned event to the MIH of a remote stack. Similarly, a lower layer contained in the remote stack generates an event and transmits the event to the MIH function of the remote stack, and the MIH function of the remote stack transmits a trigger signal to the MIH function of the local stack.

Figure 8:
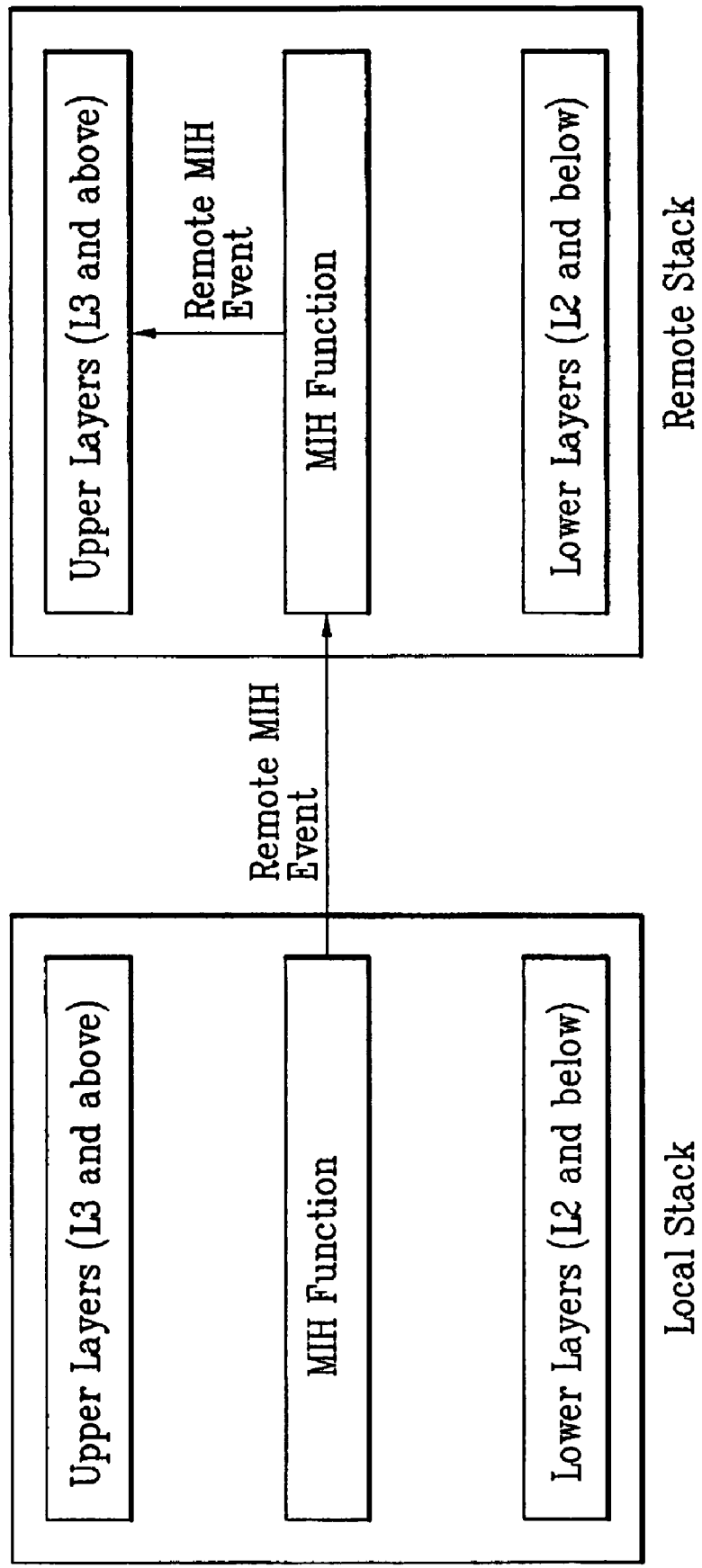
FIG. 8 is a structural diagram illustrating a "Remote MIH Event" model in accordance with one embodiment of the present invention.

FIG. 8 is a structural diagram illustrating a "Remote MIH Event" model in accordance with one embodiment of the present invention. Referring to FIG. 8, the MIH function of the local stack generates a remote MIH event, and transmits the remote MIH event to a counterpart MIH function contained in a remote stack. The MIH function of the remote stack transmits the received event to an upper management entity or an upper layer contained in the remote stack. Similarly, the MIH function of the remote stack generates an event to the MIH function of the local stack, and the MIH function of the local stack transmits the aforementioned event to the upper layer of the local stack.

Figure 9:
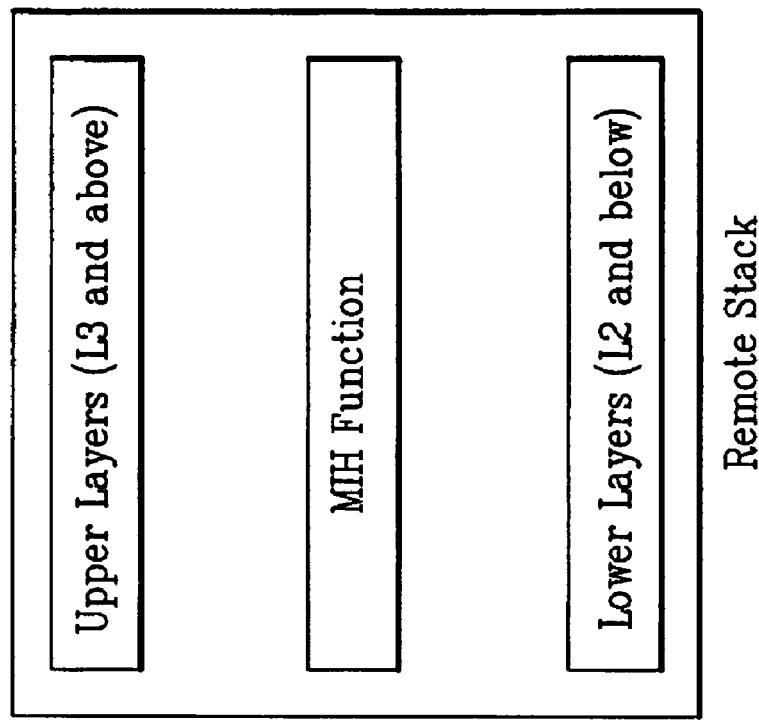
FIG. 9 is a structural diagram illustrating an "MIH command" model and a "Link command" model in accordance with one embodiment of the present invention.
Figure 9:
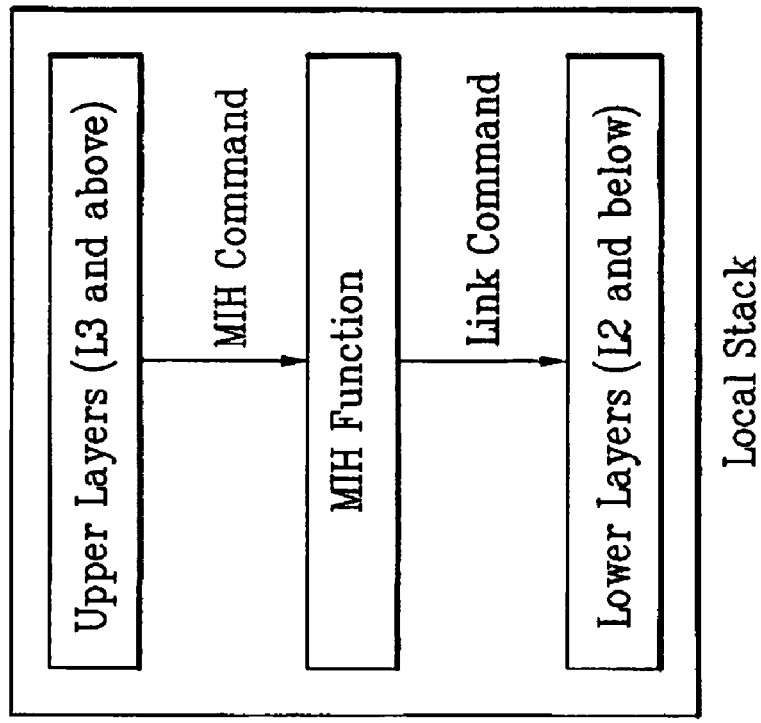

FIG. 9 is a structural diagram illustrating an "MIH command" model and a "Link command" model in accordance with one embodiment of the present invention. Referring to FIG. 9, the MIH command is generated from the upper management entity or the upper layer, and is then transmitted to the MIH function, such that it commands the MIH to perform a specific task. The link command is generated from the MIH function, and is then transmitted to the lower layer, such that it commands the lower layer to perform a specific task.

Figure 10:
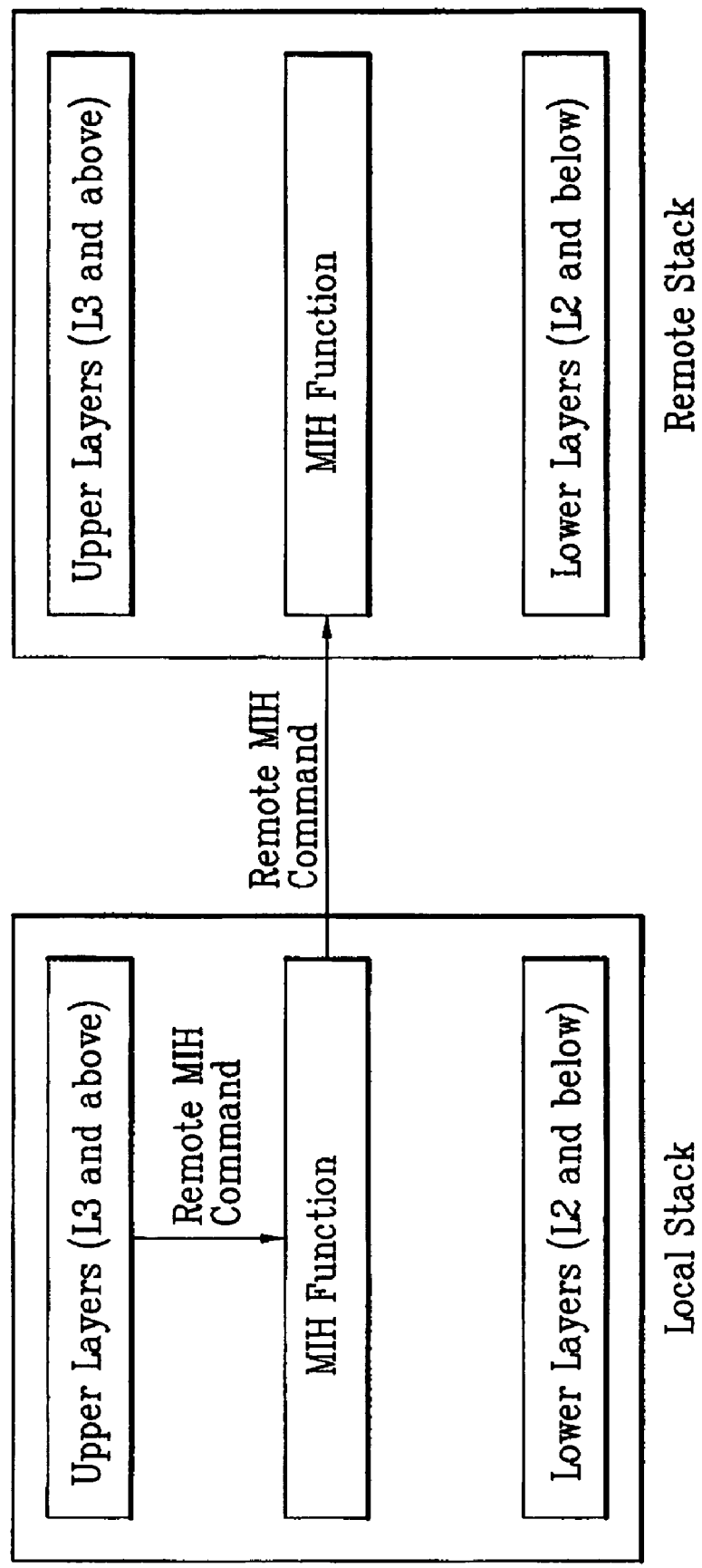
FIG. 10 is a structural diagram illustrating a "Remote MIH command" model in accordance with one embodiment of the present invention.

FIG. 10 is a structural diagram illustrating a "Remote MIH command" model in accordance with one embodiment of the present invention. Referring to FIG. 10, the remote MIH command is generated from the upper management entity or the upper layer, and is then transmitted to the MIH function. The MIH function transmits the received MIH command to a counterpart MIH function contained in a remote stack. Similarly, the upper layer contained in the remote stack generates a command and transmits the command to the MIH function of the remote stack, and the MIH function of the remote stack transmits the command to the MIH function of the local stack.

Figure 11:
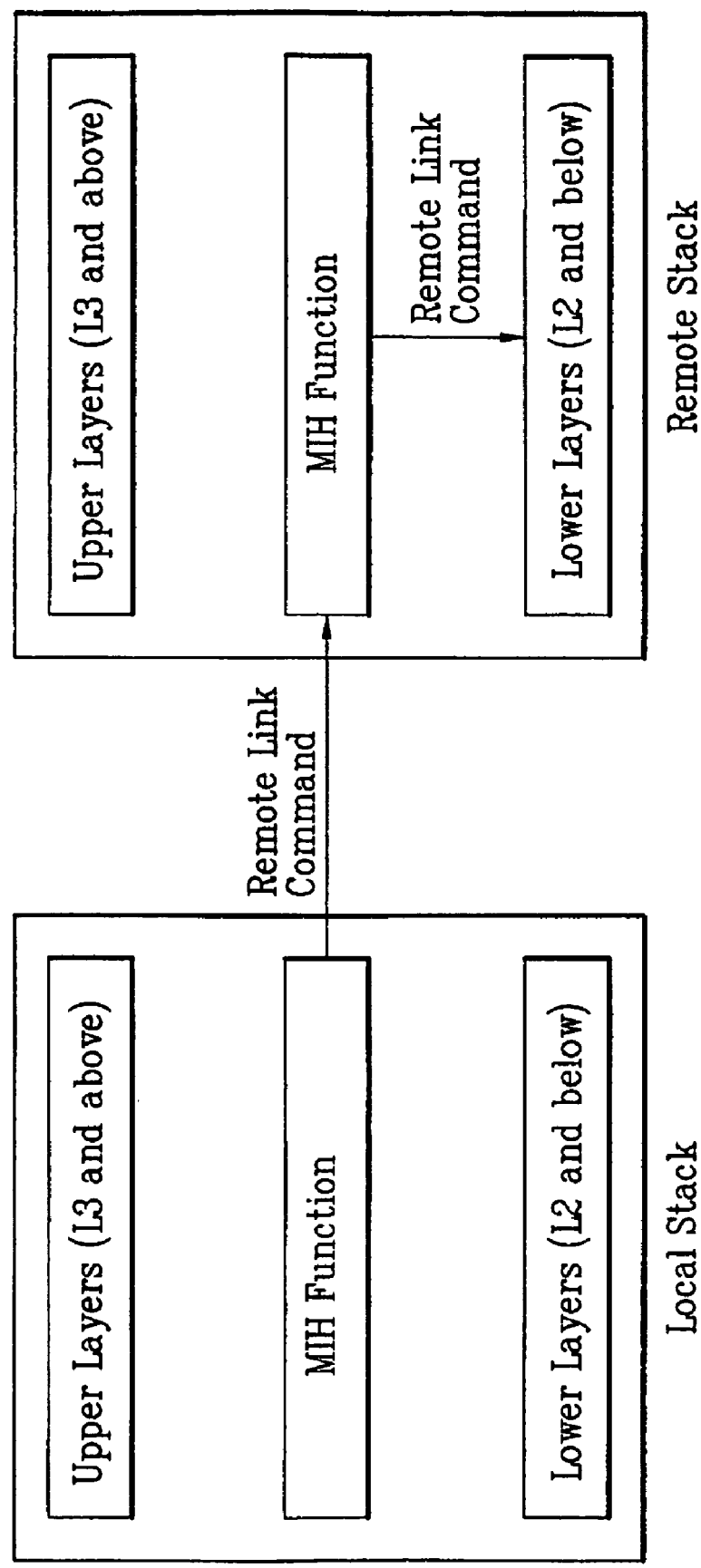
FIG. 11 is a structural diagram illustrating a "Remote Link Command" model in accordance with one embodiment of the present invention.

FIG. 11 is a structural diagram illustrating a "Remote Link Command" model in accordance with one embodiment of the present invention. Referring to FIG. 11, the MIH function contained in the local stack generates a remote link command, and transmits the remote link command to a counterpart MIH function contained in a remote stack. The MIH function contained in the remote stack transmits the remote link command to a lower layer contained in the remote stack. Similarly, the MIH function contained in the remote stack generates a command, and transmits the command to the MIH function of the local stack, and the MIH function of the local stack transmits the command to the lower layer of the local stack.

Figure 12:
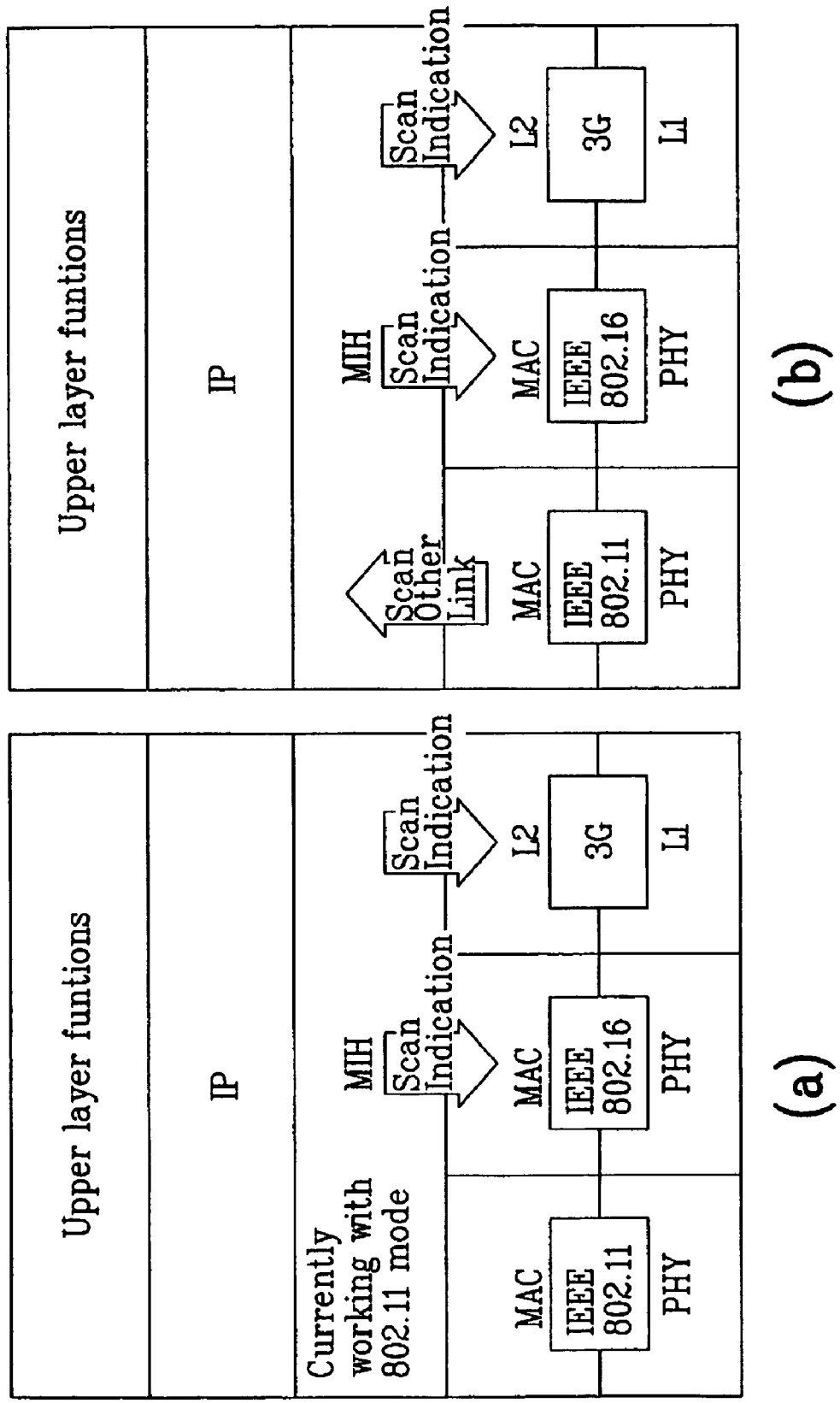
FIG. 12 is a structural diagram illustrating a protocol stack of a multi-mode mobile terminal in accordance with a preferred embodiment of the present invention.

FIG. 12 is a structural diagram illustrating a protocol stack of a multi-mode mobile terminal in accordance with a preferred embodiment of the present invention. Preferably, the aforementioned multi-mode is associated with either an interface between a broadband wireless access network system and a wireless LAN, or an interface between the broadband wireless access network system and a cellular network system.

Referring to the reference character (a) of FIG. 12, if the multi-mode mobile terminal periodically performs a scanning operation in a wireless LAN mode, an MIH function entity transmits a periodic scanning command to either a second layer (i.e., a MAC layer) of a broadband wireless access network system mode or a second layer (i.e., a MAC layer) of a 3G cellular mobile communication mode. Preferably, the MIH generates a scanning command link event "Scan_indication" to initiate other scanning operations of MAC/PHY layers, and transmits the "Scan_indication" event. Preferably, the link command transmitted from the MIH to lower MAC layers uses primitive information for use in individual interface networks. A variety of primitives can be used, for example, "M.scanning.request" information of the broadband wireless access network, "MLME-SCAN.request" information of the wireless LAN, and "CPHY-Measurement-REQ" or "CMAC-Measurement-REQ" information of the 3GPP, etc.

Referring to the reference character (b) of FIG. 12, if the multi-mode mobile terminal currently operated in the wireless LAN mode has no signal (i.e., no link) to be handed over in a homogeneous network, the MAC layer of the currently-operated wireless LAN mode generates a link search request event "Scan_Other_Link" indicating that no signal (i.e., no link) is detected from a homogeneous network, and transmits the "Scan_Other_Link" event to the MIH function entity. In this case, used primitives may correspond to primitive parameters which can indicate no available Point of Attachment (POA) in "MLME-SCAN.confirmation" information over a wireless LAN.

The MIH function entity receiving the "Scan_Other_Link" event generates a scanning command "Scan_Indication" to initiate other scanning operations of MAC/PHY layers, such that it transmits the "Scan_indication" command to either a second layer (i.e., a MAC layer) of the IEEE 802.16 mode for use in the mobile terminal or a second layer (i.e., a MAC layer) of the 3G cellular mobile communication mode for use in the mobile terminal.

For another example for initiating scanning operations of other modes, the MIH function generates a link command, such that it commands a second lower layer (i.e., a MAC layer) to initiate different scanning operations of the MAC/PHY layers. Preferably, primitives for use in individual interface networks are used as link commands. Preferably, a variety of primitives can be used, for example, "M.scanning.request" information of the broadband wireless access network, and "MLME-SCAN.request" information of the wireless LAN, etc.

Figure 13:
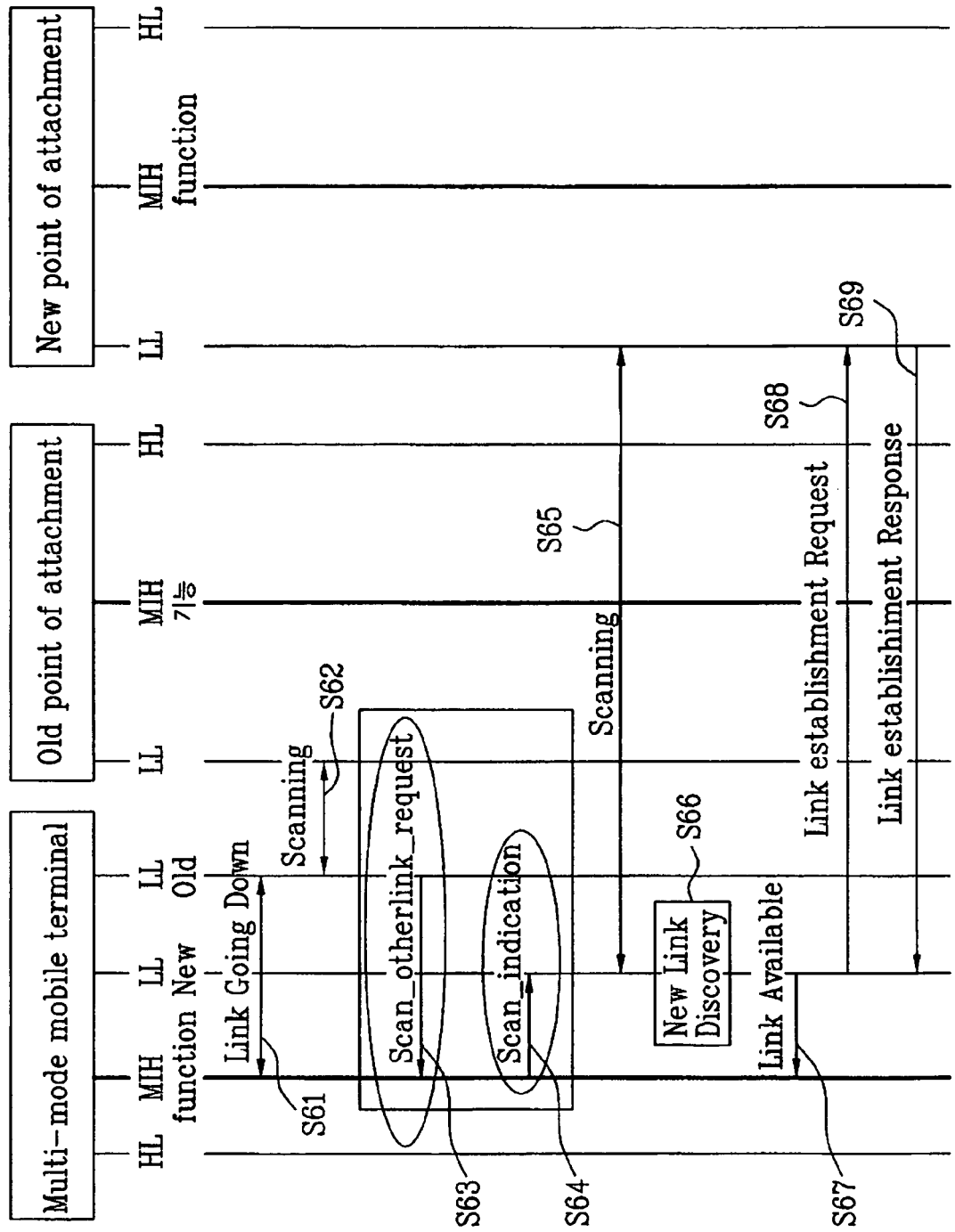
FIG. 13 is a flow chart illustrating an inventive procedure in accordance with a preferred embodiment of the present invention.

FIG. 13 is a flow chart illustrating a process for allowing the MIH to command the scanning operation in accordance with a preferred embodiment of the present invention.

Referring to FIG. 13, a MAC layer (i.e., LL old) of a current link to which a multi-mode mobile terminal is connected generates a "Link_Going_Down" trigger event when a signal quality of the current link is deteriorated, and transmits the "Link_Going_Down" trigger event to the MIH function entity. Preferably, the MIH function entity then performs a scanning process to determine whether a link accessible by a homogeneous network is present in the MAC layer of the current link at step S61.

If no link accessible by the homogeneous network is detected when the MAC layer of the current link is scanned at step S62, the MAC layer of the current link generates a link search request event "Scan_otherlink_request", and transmits the "Scan_otherlink_request" event to the MIH function entity at step S63.

The MIH function entity then receives the "Scan_otherlink_request" event from the MAC layer of the current link, generates a scanning command link command "Scan_indication", and transmits the "Scan_indication" command to a MAC layer (i.e., LL New) of a broadband wireless access network mode or a cellular mobile communication mode, such that it can command the "LL New" layer to scan an accessible heterogeneous link at step S64.

Provided that the MAC layers of other modes different from the currently-connected mode perform the scanning process at step S65, and detect an accessible heterogeneous network link at step S66, the MAC layers of the above other modes control the aforementioned MIH function entity to trigger a "Link_Available" event at step S67. The MAC layers then establish a connection state with the aforementioned new accessible heterogeneous link. Preferably, signal quality information, such as Received Signal Strength Indication (RSSI) and Signal to Interference plus Noise Ratio (SINR), of a corresponding link may be included in the "Link_Available" event such that the "Link_Available" event including RSSI and SINR may be transmitted to a destination at steps S68~S69.

Figure 14:
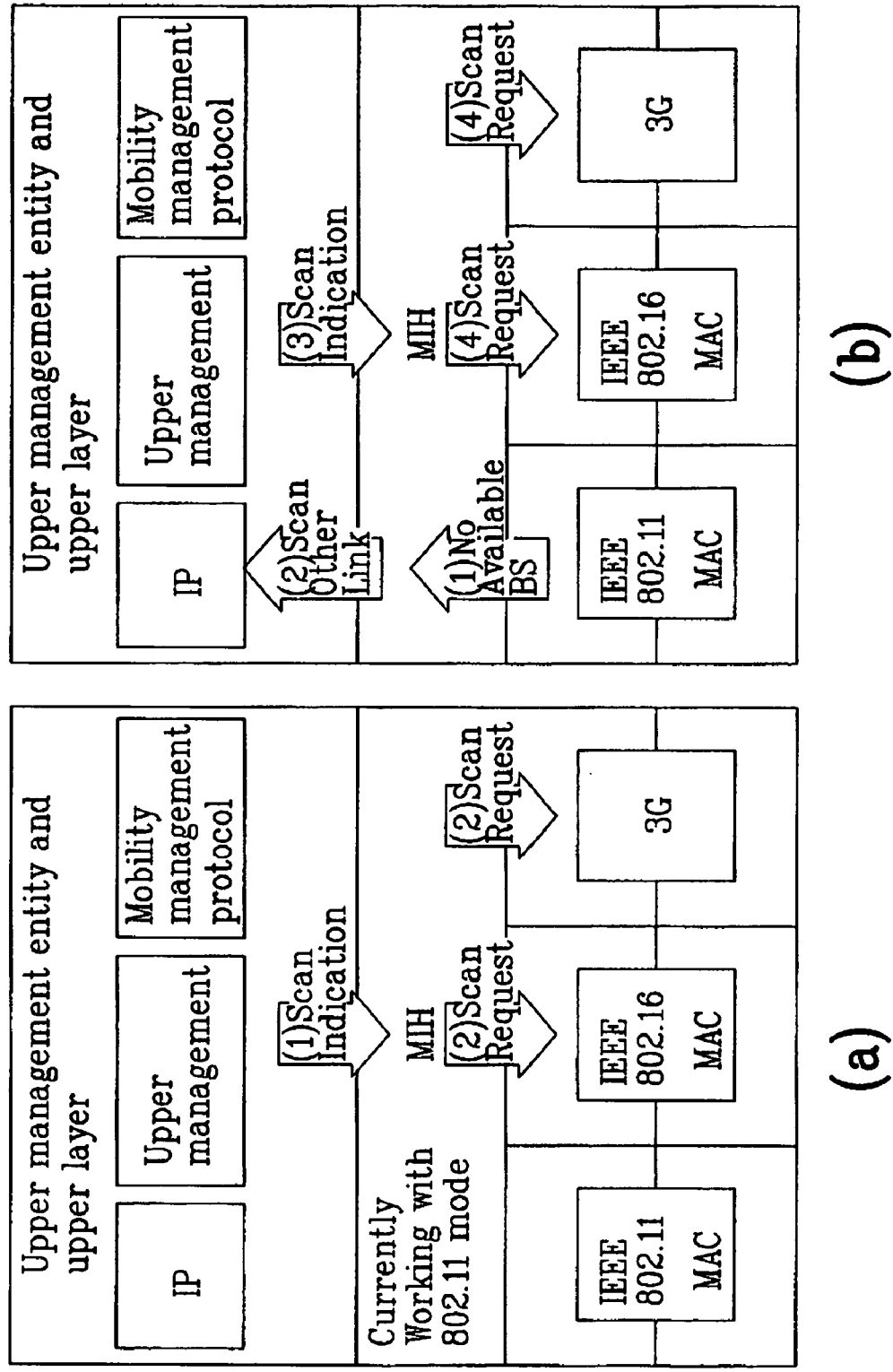
FIG. 14 is a structural diagram illustrating a protocol stack of a multi-mode mobile terminal in accordance with another preferred embodiment of the present invention.

FIG. 14 is a structural diagram illustrating a protocol stack of a multi-mode mobile terminal in accordance with another preferred embodiment of the present invention. In more detail, FIG. 14 shows an example in which an upper management entity commands the scanning operation. Preferably, the aforementioned multi-mode is associated with either an interface between a broadband wireless access network system and a wireless LAN, or an interface between the broadband wireless access network system and a cellular network system.

Referring to the reference character (a) of FIG. 14, if the multi-mode mobile terminal periodically performs a scanning operation in a wireless LAN mode (i.e., the IEEE 802.11 mode), an upper management entity transmits a periodic scanning command to either a second layer (i.e., a MAC layer) of a broadband wireless access network mode (i.e., the IEEE 802.16 mode) or a second layer (i.e., a MAC layer) of a 3G cellular mobile communication mode via the MIH.

Preferably, the upper management entity generates an MIH command "Scan_indication" to initiate other scanning operations of MAC/PHY layers, and transmits the "Scan_Indication" event to the MIH. Preferably, the MIH receiving the MIH command generates link commands, and commands lower MAC layers to perform the scanning operation. The link commands transmitted from the MIH to the lower MAC layers use primitive information for use in individual interface networks. A variety of primitives can be used, for example, "M.scanning.request" information of the broadband wireless access network, and "MLME-SCAN.request" information of the wireless LAN, etc.

Referring to the reference character (b) of FIG. 14, if the multi-mode mobile terminal currently operating in the wireless LAN mode (i.e., the IEEE 802.11 mode) has no signal (i.e., no link) to be handed over in a homogeneous network, the MAC layer of the currently-operated wireless LAN mode generates a link event indicating that no signal (i.e., no link) is detected from the homogeneous network, and transmits the link event to the MIH function entity. Preferably, used primitives may correspond to "MLME-SCAN.confirmation" primitive which can indicate no available Point of Attachment (POA) in the "MLME-SCAN.confirmation" primitive using expressible primitive parameters of the wireless LAN.

The MIH receiving the aforementioned "MLME-SCAN.confirmation" primitive generates a "Scan Other Link" event indicative of the MIH event, and transmits the "Scan Other Link" event to the upper management entity.

The upper management entity receiving the MIH event generates a "Scan_Indication" event for commanding the MIH to scan other available POAs, and transmits the "Scan_Indication" event to the MIH. The MIH then generates a link event for commanding a second lower layer (i.e., a MAC layer) to scan MAC/PHY layers.

Figure 15:
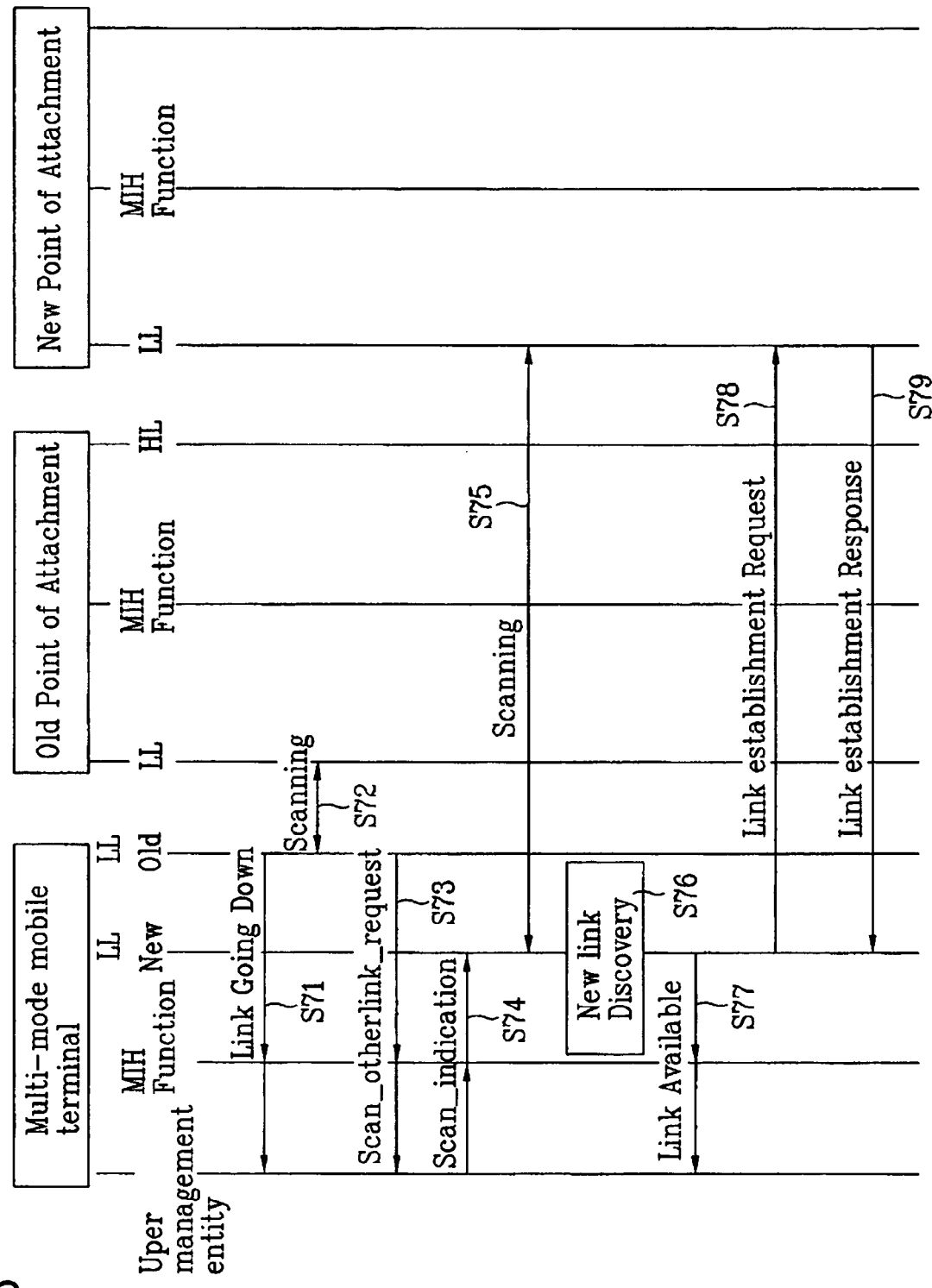
FIG. 15 is a flow chart illustrating another inventive procedure in accordance with another preferred embodiment of the present invention.

FIG. 15 is a flow chart illustrating another inventive procedure in accordance with another preferred embodiment of the present invention. In more detail, FIG. 15 is a flow chart illustrating a process for allowing the upper management entity to command the scanning operation in accordance with one embodiment of the present invention.

Referring to FIG. 15, a MAC layer (i.e., LL old) of a current link to which a multi-mode mobile terminal is connected generates a "Link_Going_Down" trigger event when a signal quality of the current link is deteriorated, and transmits the "Link_Going_Down" trigger event to the upper management entity via the MIH function entity. In this case, the upper management entity performs a scanning process to determine whether a link accessible by a homogeneous network is present in the MAC layer of the current link at step S71.

If no link accessible by the homogeneous network is detected when the MAC layer of the current link is scanned at step S72, the MAC layer of the current link generates a link event indicating that no signal (i.e., no link) is detected from the homogeneous network, and transmits the generated link event to the MIH function entity. Preferably, used primitives may correspond to "MLME-SCAN.confirmation" primitive. The "MLME-SCAN.confirmation" primitive can indicate no available POA in the aforementioned primitive using expressible primitive parameters of a corresponding wireless LAN.

The upper management entity receiving the aforementioned "Scan_otherlink_request" primitive at step S73 generates a "Scan_Indication" command acting as the MIH command in order to command the scanning operation. The upper management entity then transmits the "Scan_indication" command to the MIH, and transmits the "Scan_indication" command to a MAC layer (i.e., LL New) of the broadband wireless access network mode or a MAC layer (i.e., LL New) of the 3G cellular mobile communication mode, such that it commands individual "LL New" layers of individual modes to scan an accessible heterogeneous network link at step S74.

Provided that the MAC layers of other modes different from the currently-connected mode perform the scanning process at step S75, and detect an accessible heterogeneous network link at step S76, the MAC layers of the above other modes control the aforementioned MIH function entity to trigger a "Link_Available" event at step S77. The MAC layers then establish a connection state with the aforementioned new accessible heterogeneous link at steps S78~S79. Preferably, signal quality information (i.e., RSSI and SINR) of a corresponding link may be included in the "Link_Available" event, such that the "Link_Available" event including RSSI and SINR may be transmitted to a destination.

The following Tables 8 and 9 exemplarily show "Scan_otherlink_request" associated with an event service and "Scan_indication" associated with a command service. In more detail, the following Tables 8 and 9 exemplarily show "Scan_otherlink_request" and "Scan_indication" trigger event parameters.

TABLE 8

| Name | Type | Description |
| --- | --- | --- |
| EventSource | EVENT_LAYER_TYPE | Source at which event occurs |
| EventDestination | EVENT_LAYER_TYPE | Destination to which event is to be transmitted |
| MacMobileTerminal | MAC Address | MAC address of Mobile Terminal |

TABLE 9

| Name | Type | Description |
| --- | --- | --- |
| CommandSource | COMMAND_LAYER_TYPE | Source at which command occurs |
| CommandDestination | COMMAND_LAYER_TYPE | Destination to which command is to be transmitted |
| MacMobileTerminal | MAC Address | MAC address of Mobile Terminal |

The following Table 10 shows a signal transmission example wherein RSSI and SINR indicative of signal quality information associated with a link are added to the "Link_Available" event, such that the resultant "Link_Available" event is transmitted to a destination.

TABLE 10

| Name | Type | Description |
| --- | --- | --- |
| EventSource | EVENT_LAYER_TYPE | Source at which event occurs |
| EventDestination | EVENT_LAYER_TYPE | Destination to which event is to be transmitted |
| MacMobileTerminal | MAC Address | MAC address of Mobile Terminal |
| MacNewAccessRouter | MAC Address | MAC address of old access router |
| MacOldAccessRouter | MAC Address | MAC address of new access router |
| SINR | | Signal to Interference plus Noise Ratio (SINR) |
| RSSI | | Received Signal Strength Indication |

As apparent from the above description, a mobile terminal and a method for performing a handover of the mobile terminal in accordance with embodiments of the present invention can effectively support a handover between heterogeneous networks in a multi-mode mobile terminal.

Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of supporting media independent handover (MIH) of a mobile terminal to a heterogeneous network, the method comprising:

receiving, at a media independent handover function (MIHF) of the mobile terminal from an upper entity of the mobile terminal, a first command request comprising a layer type parameter specifying a network to be scanned from a plurality of networks and an address parameter, wherein the first command request is destined to one MIHF of the mobile terminal and a remote terminal; and transmitting, from the MIHF of the mobile terminal to a lower entity of the mobile terminal when the first command request is destined to the MIHF of the mobile terminal, a second command request to command scanning the specified network, wherein the first command request is generated at the upper entity when the upper entity attempts to initiate a scanning operation at one of the lower entity of the mobile terminal and a lower entity of the remote terminal, the layer type parameter indicating a destination which the first command request is to be transmitted to, and wherein the mobile terminal is a multi-mode mobile terminal.

2. The method of clam 1, wherein the first command request is a MIH command primitive and the second command request is a link command primitive which is transmitted to the lower entity of the mobile terminal.

3. The method of claim 2, further comprising:

receiving a second command response comprising scanning information for the specified network from the lower entity, the scanning information obtained by the lower entity; and transmitting a first command response comprising the scanning information from the MIHF to the upper entity, wherein the second command response is generated by the lower entity to report the scanning information to the MIHF, and the first command response is generated by the MIHF to report the scanning information to the upper entity.

4. The method of claim 3, wherein the second command response is a link command local primitive and the first command response is a MIH command local primitive.

5. The method of claim 3, wherein the scanning information comprises a received signal strength indication (RSSI).

6. The method of the claim 3, wherein the first command response further comprises the layer type parameter and the address parameter.

7. The method of claim 5, wherein the scanning information further comprises a list of the specified network.

8. The method of claim 1, wherein the second command request is generated at the MIHF based on the first command request.

* * * * *